April 7, 1959  H. C. KING  2,880,937
POWER DRIVEN AMBULATORY IRRIGATION SPRINKLER
Filed June 21, 1956  3 Sheets-Sheet 1

Henry C. King
INVENTOR.

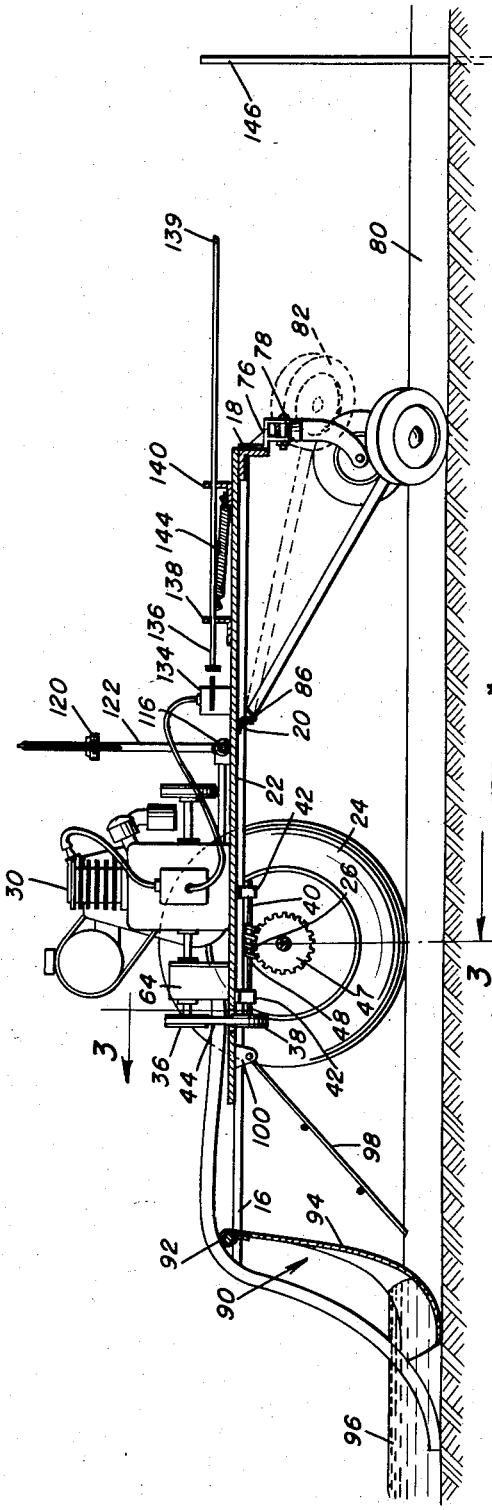

April 7, 1959　　　　H. C. KING　　　　2,880,937
POWER DRIVEN AMBULATORY IRRIGATION SPRINKLER
Filed June 21, 1956　　　　　　　　　　　　3 Sheets-Sheet 3
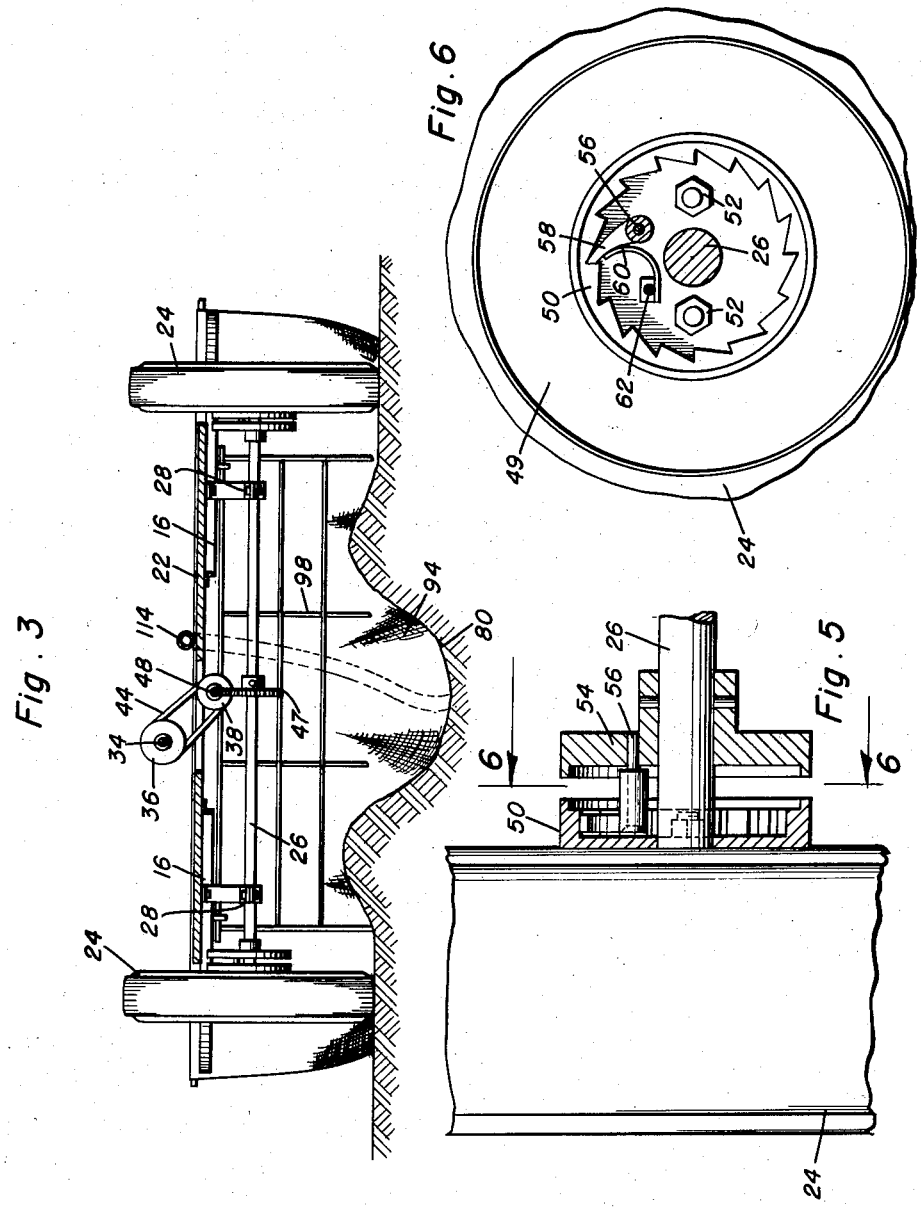
Henry C. King
INVENTOR.

United States Patent Office 2,880,937
Patented Apr. 7, 1959

2,880,937

POWER DRIVEN AMBULATORY IRRIGATION SPRINKLER

Henry C. King, Livingston, Mont., assignor of forty percent to Elise King, Livingston, Mont.

Application June 21, 1956, Serial No. 592,834

1 Claim. (Cl. 239—181)

This invention relates in general to new and useful improvements in irrigation equipment, and more specifically to improve the irrigation sprinkler.

At the present time many farms have running therethrough irrigation ditches. However, in order that the water from the irrigation ditch may be distributed to the surrounding soil, it is necessary that there be provided a pump for pumping the water from the irrigation ditch and suitable pipes having sprinkling means for distributing the water. Since the sprinklers will only reach a certain area, it is normally necessary that the pipes and sprinkler be moved periodically in order to assure proper irrigation of a large area. Such a procedure is not only time-consuming but requires a large amount of labor at the time when such labor may be used to other advantages.

It is therefore the primary object of this invention to provide an improved irrigation sprinkler which includes a machine which will run down an irrigation ditch and receive water therefrom, the machine having suitable sprinkling means and a pump whereby the land on opposite sides of the irrigation ditch is irrigated as the machine moves along the irrigation ditch.

Still another object of this invention is to provide an improved irrigation sprinkler, the irrigation sprinkler being in the form of a self-propelled machine having suitable means for receiving water from an irrigation ditch and distributing it over surrounding land, the machine being so constructed whereby it moves down the irrigation ditch without any operator.

Another object of this invention is to provide an improved irrigation sprinkler which includes a suitable frame having motorized means for driving the same, there being carried by the rear part of the frame a portable dam which is seated in an irrigation ditch in which the machine runs and which backs up the water behind the machine for assuring the proper supply of water for the pump means carried by the machine.

A further object of this invention is to provide an improved irrigation sprinkler, the sprinkler including a wheeled frame, there being carried by the frame front guide wheels which are suitable in the irrigation ditch and which serve to retain the frame in alignment with the ditch whereby the irrigation sprinkler will move directly down the line of the vehicle.

A still further object of this invention is to provide an improved irrigation sprinkler which is of the motorized type, there being provided suitable stop means for controlling the operation of the motor whereby a stake or other similar object may be driven in the ground at the desired point of stopping the machine and the stop means will automatically cut-off the motor of the irrigation sprinkler.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 2 is a longitudinal sectional view taken substantially upon the plane indicated by the section line 2—2 of Figure 1 and shows further the details of the irrigation sprinkler and the relationship thereof with respect to the irrigation ditch, front guide wheels of the irrigation sprinkler being shown in an elevated inoperative position by dotted lines;

Figure 3 is a fragmentary transverse vertical sectional view taken substantially upon the plane indicated by the section line 3—3 of Figure 2 and shows generally the details of the drive for the irrigation sprinkler and the relationship of the dam carried thereby with respect to the irrigation ditch;

Figure 4 is a fragmentary plan view of the irrigation sprinkler and shows the general mounting of the power unit thereof and the connection between the power unit and both guide means for the irrigation sprinkler and a pump thereof;

Figure 1:
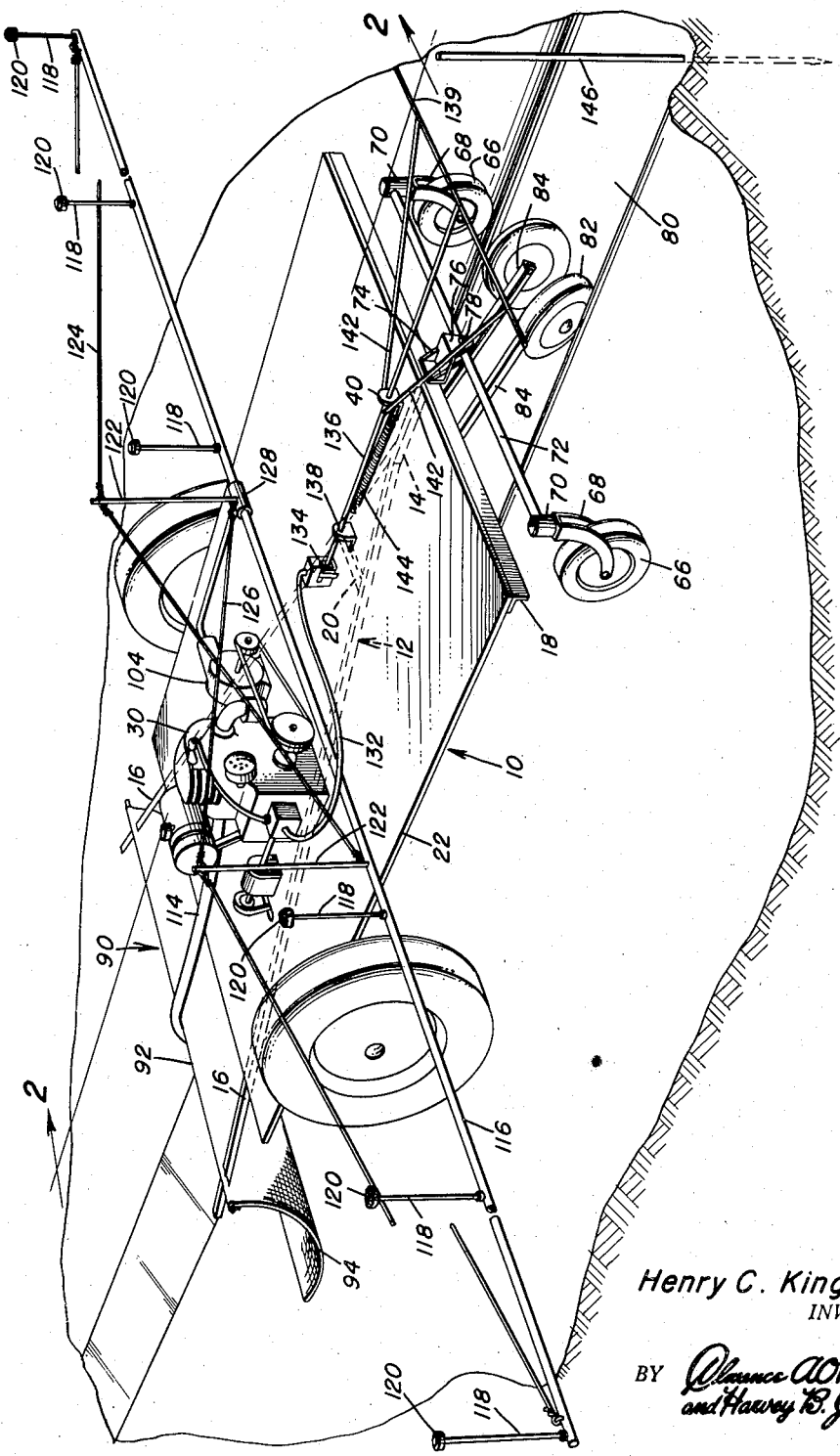
Figure 1 is a perspective view of the irrigation machine which is the subject of this invention and shows it positioned in an irrigation ditch, outer portions of supply pipes and sprinklers carried thereby being broken away.

Figure 5 is an enlarged fragmentary sectional view taken through the irrigation sprinkler in the vicinity of one of the drive wheels and shows generally the details of the means for driving the drive wheel; and Figure 6 is an enlarged fragmentary sectional view taken substantially upon the plane indicated by the section line 6—6 of Figure 5 and shows further the details of the drive means for the drive wheel.

Referring now to the drawings in detail, it will be seen that there is illustrated the irrigation sprinkler which is the subject of this invention, the irrigation sprinkler being referred to in general by the reference numeral 10. The irrigation sprinkler 10 includes a general Y-shaped frame which is referred to in general by the reference numeral 12. The Y-shaped frame 12 includes a central forward frame member 14 which is connected at its rear end to a pair of rearwardly extending diverging frame members 16. Also, there is connected to the forward end of the frame member 14 a transverse front frame member 18. The frame members 16 are connected together intermediate their ends by an intermediate transverse frame member 20. Overlying the frame 12 and secured to the frame members thereof is a suitable platform 22.

In order that the frame 12 and the platform 22 may move, they are supported by a pair of rear drive wheels 24. The drive wheels 24 are rotatably mounted on the outer end of a rear axle 26 which is suitably supported by bearings 28 depending from the frame members 16, the axle 26 being rotatable.

In order that the drive wheels 24 may be driven, there is mounted on the platform 22 an internal combustion engine 30 which has a forwardly extending driveshaft 32 and a rearwardly extending driveshaft 34. Formed on the rear end of the drive shaft 34 is a drive pulley 36 which is aligned with the pulley 38. The pulley 38 is disposed beneath the platform 22 and is carried by a longitudinal shaft 40 supported beneath the platform 22 by suitable bearing members 42. The pulleys 36 and 38 are drivingly connected together by a drive belt 44 which passes downwardly through an opening 46 in the platform 22.

An intermediate portion of the axle 26 is provided with a ring gear 47. Drivingly engaged with the ring gear 47 is a worm gear 48. Thus the axle 26 is driven from the internal combustion engine 30 which functions as the power unit of the irrigation sprinkler 10.

For a reason to be described in more detail, there may be a tendency for the irrigation sprinkler 10 to be driven exclusive of the wheels 24. Accordingly, there is provided a one-way drive connection between the rear drive wheels 24 and the axle 26.

As was previously described, the rear drive wheels 24 are mounted on the ends of the axle 26 for rotation relative thereto. Rigidly secured to an inner surface of a drum 48 of each wheel 24 is an annular rack 50. The rack 50 is secured in place by suitable fasteners 52. Carried by the axle 26 adjacent each rack 50 is the driving hub 54 which carries a pin 56 on which is pivotally mounted a dog 58. The dog 58 is normally urged into engagement with the rack 50 by means of the spring 60 which is suitably secured to the mounting hub 54 by means of a fastener 62. From the foregoing, it will be readily apparent that the drive wheels 24 may be used for the purpose of driving the irrigation sprinkler 10, but that the irrigation sprinkler 10 may be moved at a faster rate than the drive wheels 24 are driven.

In order that the speed of driving the rear wheels 24 may be that desired, suitable reduction gearing may be provided. Such reduction gearing may be in the form of a reduction gear box 64 which is mounted in the shaft 34 intermediate the ends thereof.

The forward part of the frame 12 and the platform 22 is supported by a pair of front support wheels 66. The front support wheels 66 are supported by suitable forks 68 which are rotatably journaled in sleeves 70 carried by other ends of a transverse wheel support 72. It is to be understood that the wheels 66 have a caster action.

In order that the wheel support 72 may be suitably mounted, there is secured to the forward face of the transverse frame member 18 at the center thereof a suitable mounting bracket 74. The mounting bracket 74 includes a depending yoke portion 76 carrying a longitudinal pivot pin 78. The pivot pin 78 passes through the wheel support 72 and mounts it for transverse rocking movement. Thus the front support wheels 66 may accommodate themselves to the various terrain on opposite sides of an irrigation ditch, such as the irrigation ditch 80.

In order that the irrigation sprinkler 10 may travel down the irrigation ditch, such as the irrigation ditch 80 without being steered or attended, there is provided a pair of fixed guiding front wheels 82. The guiding front wheels 82 are carried by forwardly extending diverging wheel supports 84. The rear ends of the wheel supports 84 are connected together by a hinge member 86 which is in turn connected to the intermediate transverse frame member 20. Inasmuch as the guiding wheels 82 are mounted for rotation about a horizontal transverse axis only, it will be readily apparent that they will tend to position the forward part of the irrigation sprinkler 10 in alignment with the irrigation ditch 80 at all times. Due to the provision of the hinge 86, it will be seen that the guiding wheels 82 may be selectively moved to an elevated inoperative position, such as that shown in Figure 2.

In order to assure an adequate supply of water for the irrigation sprinkler 10 and at the same time to assist in the moving thereof along the irrigation ditch 80, there is carried by the rear part of the frame 12 a suitable trailing dam which is referred to in general by the reference numeral 90. The dam 90 includes a transverse support rod 92 which is secured to rear portions of the frame member 16. Connected to the support rod 92 and extending downwardly therefrom is a water resistant flexible cloth-like member 94 which will seat in the irrigation ditch 80 and conform to the general contours thereof so as to substantially back up water in the irrigation ditch 80 behind the irrigation sprinkler 10. As is best illustrated in Figure 2, in order that the cloth-like member 94 may not be pushed out beneath the frame 12 by the force of water 96 in the irrigation ditch 80 thereon, there is secured to the frame members 16 forwardly of the support rod 92 a reinforcing bar assembly 98. The reinforcing bar assembly 98 is pivotally carried by suitable mounting brackets 100 secured to the frame members 16 or to the platform 22, as desired.

Mounted on the platform 22 adjacent the internal combustion engine 30 is a suitable pump 104. The pump 104 includes a drive shaft 106 having a pulley 108 mounted thereon. The pulley 108 is transversely aligned with the pulley 110 carried by the shaft 32. Entrained over the pulleys 108 and 110 and connecting the two together is a suitable drive belt 112.

The pump 104 is provided with a suction hose 114. The suction hose 114 extends rearwardly from the platform 22 and over the support rod 92. The suction hose 114 trails in the irrigation ditch 80 below the surface of the water 96 backed up by the dam 90 in the manner best illustrated in Figure 2.

Extending transversely of the platform 22 and projecting outwardly to opposite sides thereof is a water distributing pipe 116 which has extending upwardly therefrom at spaced intervals water supply pipes 118. The upper ends of the water supply pipes 118 are provided with suitable sprinkling heads 120. It is to be understood that the number of sprinkling heads 120 may vary as desired.

Because of the extreme length of the water distributing pipe 116, there is provided a suitable bracing which includes guy wires 124. The guy wires 124 have their outer ends connected to outer end portions of the water distributing pipe 116 and the inner ends connected to suitable vertical supports 122. The vertical supports 122 are braced with respect to each other by a suitable X-bracing 126.

The water distributing pipe 116 is provided with a fitting 128 intermediate its ends to which there is connected a water supply line 130. The water supply line 130 is connected to an outlet portion 132 of the pump 104.

The internal combustion engine 30 is provided with a suitable grounding wire 132 which when grounded to the platform 22 will cut-out the ignition system of the internal combustion engine 30 and thus stop it. In order that the grounding wire 132 may be grounded to the platform 22, there is provided a switch structure 134 mounted on the platform 22. In order to control the operation of the switch structure, there is provided a longitudinally extending rod 136 carried by a suitable bracket 138 and 140. The forward end of the rod 136 has connected thereto a transverse rod 139 which is braced relative to the rod 136 by means of diagonal braces 142. The rod 136 is retained in a forward position by means of a spring 144 which is connected to the rod 136 forwardly of the bracket 138 and whose opposite end is connected to the bracket 140. The transverse rod 139 is of a width to extend the full width of the irrigation ditch 80. At the point it is desired to stop the movement of the irrigation sprinkler 10, there is removably driven a suitable rod 146. The rod 146 is engaged by the transverse rod 139 which in turn moves the rod 136 rearwardly to actuate the switch 134 and ground the ignition of the internal combustion engine 30 to stop it.

From the foregoing description of the irrigation sprinkler 10, it will be readily apparent that because it is guided by the irrigation ditch itself and since it may automatically be stopped, the irirgation sprinkler 10 may be started in an irrigation ditch 80 at any desired point and left unattended to run the desired length of the irrigation ditch 80 until it strikes the rod 146. It is to be understood that the rate of travel of the irrigation sprinkler 10 will be such that the desired quantity of water is sprinkled on the land adjoining the irrigation ditch 80. Also, it is to be understood that very little power will be required to move the irrigation sprinkler 10 inasmuch as the water pressure on the dam 90 greatly facilitates the movement of the irrigation sprinkler. Because of the fact that the irrigation sprinkler 10 will run unattended and may be stopped at any desired point, it will be readily apparent that the irrigation sprinkler 10, if desired, may be started at the close of the workday and may run during the night to the desired stopping point.

When it is desired to move the irrigation sprinkler 10 to some other location, it is merely necessary to lift the front guiding wheels 82 out of the irrigation ditch 80 and then to swing the entire irrigation sprinkler 10 around and head it in the desired direction. If desired, the irrigation sprinkler 10 may be rotated through a 180° angle and sent back up the irrigation ditch 80 to its original starting point on its own power and without guidance. It is to be readily understood that one person may operate the irrigation sprinkler 10 and control its movement thereof including the turning around of the irrigation sprinkler. This is a highly desirable feature inasmuch as more than one man may not be readily available at the same time, or at least the time it is desired to turn or otherwise move the irrigation sprinkler 10.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

An irrigation sprinkler for traversing an irrigation ditch and receiving water from the irrigation ditch, said irrigation sprinkler comprising a frame, support wheels for said frame, said support wheels including a pair of rear wheels of which one is a drive wheel and a pair of front support wheels, said front support wheels being of the caster type, said front and rear support wheels being widely spaced and disposed on opposite sides of the irrigation ditch with said frame overlying said irrigation ditch, a power unit mounted on said frame, drive means extending between and connecting said one rear drive wheel to said power unit, a mounting bracket secured to the underside of said frame in depending relation rearwardly of the front end of said frame, a wheel support pivotally connected to said frame by said mounting bracket for pivoting about a horizontal axis, said wheel support extending forwardly from said mounting bracket, closely spaced front guide wheels, means on said wheel support mounting said front guide wheels in upwardly diverging relation and for rotation only relative to said wheel support, a trailing dam secured to said frame for damming the irrigation ditch rearwardly of said frame, a sprinkler mounted on said frame, a pump mounted on said frame, a suction hose connected to said pump, the opposite end of said suction hose being disposed in the irrigation ditch rearwardly of said dam for receiving water from the irrigation ditch, a supply line connecting said pump to said sprinkler, other drive means extending between and connecting together said pump and said power unit, and a control mechanism for said power unit, said control mechanism including a control switch, a forwardly extending actuator for said switch, said actuator projecting forwardly of the remainder of the irrigation sprinkler and terminating in a transverse member adapted to engage an abutment which may be placed in the irrigation ditch to shut off said power unit.

References Cited in the file of this patent
UNITED STATES PATENTS

| | | |
|---|---|---|
| 1,902,412 | Melin | Mar. 21, 1933 |
| 2,574,634 | Frampton | Nov. 13, 1951 |
| 2,602,696 | Salatin | July 8, 1952 |
| 2,718,433 | Poynor | Sept. 20, 1955 |